Sept. 11, 1962     C. W. ATTWOOD     3,053,355
CURVED NUT WITH EDGES TO BITE INTO CHANNEL FLANGES
Filed July 22, 1957
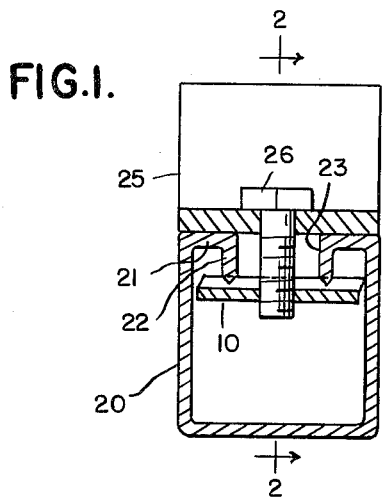
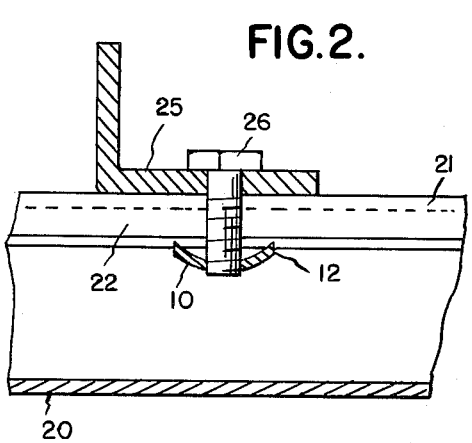
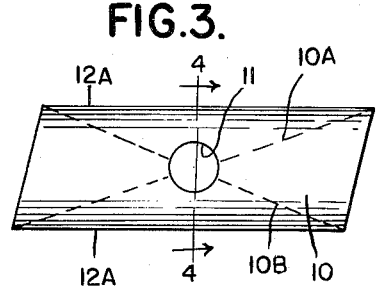
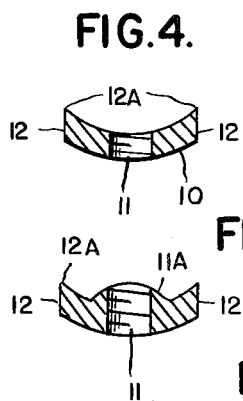
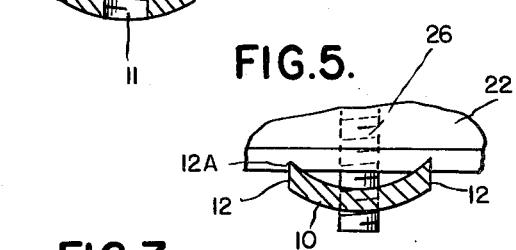
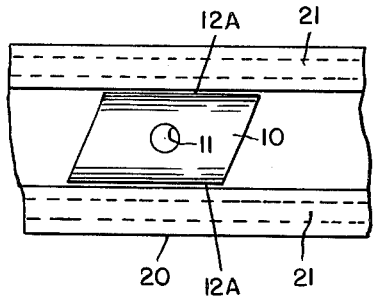
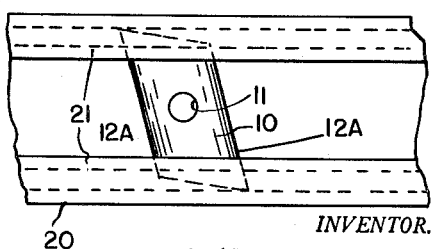
*INVENTOR.*
CHARLES W. ATTWOOD
ATTORNEYS

United States Patent Office 3,053,355
Patented Sept. 11, 1962

3,053,355
CURVED NUT WITH EDGES TO BITE INTO CHANNEL FLANGES
Charles W. Attwood, 418 S. Wayne Road, Wayne, Mich.
Filed July 22, 1957, Ser. No. 673,241
3 Claims. (Cl. 189—36)

The present invention relates to nuts primarily for a specific use but capable of a more general though limited use.

The specific use for which the nut is primarily intended is for securing fittings or other items to the structural material known in the trade as "Unistrut." This is a rectangular metallic channel material in which the edge portions of the metal channel are turned in at right angles to the side wall and again turned inwardly of the channel so that a cross section shows a rectangular member having along one face a slot of less width than the particualr face and having inwardly projecting flanges along the sides of the slot. Also the edges of the flanges are double bevelled to present a sharp edge.

Among the objects of the invention is to provide a light service nut for use with such material.

Another object is to provide a nut which may be inserted through the slot but which when partially rotated will extend crosswise of the slot and flanges and will coact with the latter to prevent movement lengthwise of the slot.

Another object is to provide a nut having sharpened edges which will bite into the sharpened flange edges when a suitable screw or bolt is threaded into the nut and screwed tight.

Other objects and advantages will readily occur to those skilled in the art upon reference to the following description and the accompanying drawings in which FIG. 1 is a cross section of a piece of the described channel showing the nut in place therein.

FIG. 2 is a section on line 2—2 of FIG. 1.

FIG. 3 is a plan view of one of the nuts.

FIG. 4 is a section on line 4—4 of FIG. 3.

FIG. 5 is an enlargement of a portion of FIG. 2.

FIG. 6 and FIG. 7 show in plan short portions of "Unistrut" channel and the two portions of the nut in use.

FIG. 8 is a section similar to FIG. 4 but showing a modification.

As shown in the drawings, particularly FIGS. 3, 4 and 6, a nut embodying the present invention consists preferably of a hardened steel plate 10 uniformly arcuately sloped from edge faces 12 toward its longitudinal centerline or axis as shown best in FIG. 4 to provide a concave surface and provided with a tapped opening 11, centrally located. The planes of the longitudinal edge faces 12 of the plate 10 are substantially parallel to the axis of the opening 11 so that the upper corners or edges (as seen in FIG. 4) intersect with the concave surface to form sharp edges 12A.

As shown best in FIG. 3, the ends of the nut are cut or otherwise produced at an angle to the longitudinal axis for a purpose explained below.

The plate 10 should be of sufficient thickness to provide several threads in the opening 11, but in order to increase the number of threads, the metal around the opening may be formed up as shown in FIG. 8 at 11A.

While the edge faces 12 are above described as parallel to the axis of the opening 11, substantial variation of the parallel relation is permissible. The essential characteristic is that edge 12A be relatively sharp and hardened.

The nut above described has been designed for and is most advantageously used with the channel material above defined and designated by the trade name "Unistrut."

A section of such material is shown in FIGS. 1 and 2 at 20, and shows the side walls as having their edge portions turned inwardly as at 21 and then downwardly into the channel as at 22, the edge being double bevelled or sharpened.

The portions 21 and 22 are so proportioned as to leave between the thus produced flanges 22 a longitudinal slot 23.

In using the nut to aid in securing brackets, fixtures or other items, for example an angle 25 to the member 20, a suitable screw or bolt 26 is passed through the angle 25 and the nut 10 loosely threaded thereon. The nut 10 is then passed through the slot 23 to a position below the flanges 22, the width of the nut being somewhat less than the width of the slot.

When the screw is rotated, the nut 10 will turn with it until the outer corners of the nut ends strike the inside surfaces of the side walls of the channel, at which time the nut will be transverse of the slot and flanges 22.

In order to provide for this positioning of the nuts, its ends, as stated above, are formed at an inclined angle to the longitudinal axis of the nut, and the length is such that the longer diagonal 10A of the nut is somewhat greater than the distance between the inner side faces of the channel, while the shorter diagonal 10B of the nut is made somewhat less than said distance.

Upon further tightening of the screw 26, the nut 10 will be drawn against the edges of flanges 22 and the sharp edges 12A will cut into the bevelled edges of the flanges and prevent any movement lengthwise of the channel.

The arcuate cross sectional shape of the nut offers great resistance to any bending under the stresses to which it may be subjected.

I claim:

1. In combination, a structural member having in one face a longitudinal slot bordered by inwardly projecting flanges, and a nut comprising a plate relatively long compared to its width and having opposite longitudinal side surfaces parallel and end surfaces at an inclined angle to the side surfaces, said plate being arcuate about its longitudinal centerline to provide a concave surface and provided with a centrally located tapped opening, the longer diagonal of said nut being somewhat greater than the inner lateral dimension of the member with the shorter diagonal being less than said dimension, the intersection of said side surfaces and said concave surfaces of said nut presenting a pair of longitudinally extending sharpened edges inwardly of its arc, said pair of edges being in a common plane and being of a width substantially equal to but less than the width of the slot in said member.

2. In combination, a structural channel member having its longitudinal sides inturned toward each other and further inwardly bent at the edges, and a nut comprising a plate having parallel side edges and parallel end edges and extending with its side edges laterally across said channel edges, said plate being uniformly arcuately sloped from said side edges toward a centerline disposed in the plane of said plate and equidistant from said side edges to provide a concave surface, the intersection of said concave surface with the side edges of said nut forming opposite sharp edges parallel to said centerline and in a common plane extending laterally across said channel edges, and means compressing said sharp edges against said channel edges whereby to prevent longitudinal displacement of said nut with respect to said channel.

3. The combination as defined in claim 2 and in which the edges of said channel are relatively pointed in lateral cross section, whereby the sharp edges of said nut make substantially point contacts with the sharp edges of said channel.

References Cited in the file of this patent
UNITED STATES PATENTS

| | | |
|---|---|---|
| 886,318 | Eicher | Apr. 28, 1908 |
| 1,770,960 | Wells | July 22, 1930 |
| 2,676,680 | Kindorf | Apr. 27, 1954 |
| 2,944,642 | Evans | July 12, 1960 |

FOREIGN PATENTS

| | | |
|---|---|---|
| 741,668 | Great Britain | Dec. 7, 1955 |